United States Patent Office 2,794,837
Patented June 4, 1957

2,794,837
PRODUCTION OF 2-METHYLOL-3-KETO-BUTENE (1,2)

Walter Grimme, Utfort, Moers, and Johannes Wöllner, Moers, Germany, assignors to Rheinpreussen Aktiengesellschaft fuer Bergbau und Chemie, Homberg, Niedersheim Germany, a German corporation No Drawing. Application July 29, 1954,
Serial No. 446,658

Claims priority, application Germany August 3, 1953

3 Claims. (Cl. 260—594)

The unsaturated ketoalcohol 2-methylol-3-ketobutene (1,2) may be produced from 1,1-dimethylolacetone by splitting off water. This reaction proceeds in accordance with the following equation:

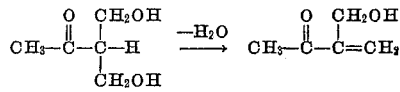

The starting 1,1-dimethylolacetone is, however, difficult to obtain, and may only be produced technically with small yields.

One object of this invention is the production of 2-methylol-3-ketobutene (1,2) from a more readily obtainable starting product. This, and still further objects will become apparent from the following description:

It has now been found that 2-methylol-3-ketobutene (1,2) may be produced by heating 1,1,1-trimethylolacetone to a temperature from 100 to 300° C., at a pressure from 0.01 to 1 atmosphere in the presence of a dehydrating agent. The heating is preferably effected at a temperature between about 120 and 250° C. and advantageously under vacuum, corresponding to an absolute pressure of 10 to 300 mm. mercury.

Any conventional dehydrating agent, such as strong acids for example mineral acids such as hydrochloric acid, phosphoric acid, or sulfuric acid; or aromatic sulfonic acids for example benzene sulfonic acid or toluene sulfonic acid; or surface active materials for example pumice, aluminium hydroxide, or aluminium hydrosilicate may be used. The dehydrating agents are applied in an amount of 1 to 10%, preferably 2 to 5% of weight related to the quantity of 1,1,1-trimethylolacetone used.

The reaction proceeds with the splitting off of 1 mol of formaldehyde and 1 mol of water in accordance with the following equation:

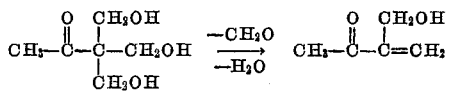

The 1,1,1-trimethylolacetone, which may also be designated 3,3,3-trimethylolacetone, may be obtained in accordance with our co-pending application, Serial No. 429,694, filed May 13, 1954.

The 2-methylol-3-ketobutene (1,2) produced in accordance to the invention is a valuable reagent in the production of synthetic resins and may be used as a solvent and an intermediate product in the pharmaceutical industry.

The following examples are given by way of illustration and not limitation:

Example 1

100 gr. of crystallized 1,1,1-trimethylolacetone produced in accordance with United States patent application, Serial No. 429,694, and 4 gr. of finely powdered pumice were thoroughly mixed together in a mortar. The mixture was then slowly heated under the vacuum of a water jet pump on an oil bath which had a temperature of 180–210° C. At a distillation temperature of nearly 40° C., the splitting off of water could be noted. After the water had distilled off, the distillation temperature increased to 80–95° C. at 18 mm. Hg and 66 gr. of 2-methylol-3-ketobutene (1,2) distilled over. The 2-methylol-3-ketobutene (1,2) was further purified by repeated fractionation.

Example 2

The Example 1 was repeated by using 5 gr. of powdered aluminium hydrosilicate instead of pumice, all the other conditions being the same. The yield on the 2-methylol-3-ketobutene (1,2) amounted to 66.2 grams.

Example 3

100 gr. of crystallized, 1,1,1-trimethylolacetone and 10 cc. of 96% sulfuric acid were heated as described in Example 1. There were received 64.5 grams of the ketobutene.

Example 4

The Example 3 was repeated by using 5 grams of toluene sulfonic acid as dehydrating agent, instead of sulfonic acid. Under the same conditions for the rest, 65 grams of the ketobutene were obtained.

We claim:
1. Method for the production of 2-methylol-3-ketobutene (1,2), which comprises heating 1,1,1-trimethylolacetone at a pressure from 0.01 to 1 atmospheres to a temperature of 100° to 300° C. in the presence of a dehydrating agent, to thereby split off formaldehyde and water, and recovering the 2-methylol-3-ketobutene (1,2) formed.

2. Method according to claim 1, in which said heating is effected at a temperature about 120–250° C.

3. Method according to claim 1, in which said heating is effected under a vacuum corresponding to an absolute pressure of 10 to 300 mm. mercury.

References Cited in the file of this patent
FOREIGN PATENTS 389,884   Great Britain _____ Mar. 30, 1933